No. 866,545. PATENTED SEPT. 17, 1907.
A. W. WHITMAN.
COFFEE POT.
APPLICATION FILED MAR. 5, 1906.
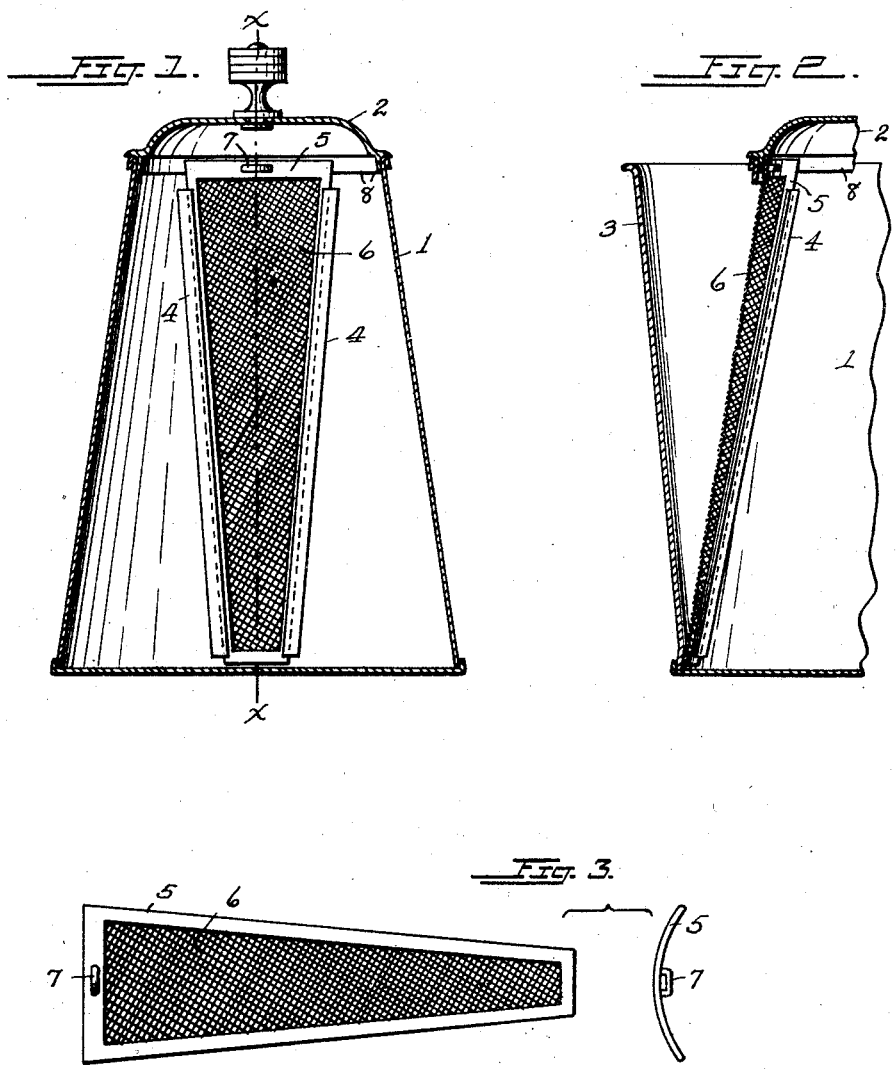
WITNESSES:
Alvin W. Whitman,
INVENTOR
BY
ATTORNEY.

UNITED STATES PATENT OFFICE.

ALVIN W. WHITMAN, OF READING, PENNSYLVANIA.

COFFEE-POT.

No. 866,545.   Specification of Letters Patent.   Patented Sept. 17, 1907.

Application filed March 5, 1906. Serial No. 304,216.

*To all whom it may concern:*

Be it known that I, ALVIN W. WHITMAN, a citizen of the United States, residing at Reading, in the county of Berks and State of Pennsylvania, have invented certain new and useful Improvements in Coffee-Pots, of which the following is a specification.

This invention relates to improvements in coffee-pots, and the object of the invention, is to produce a coffee-pot in which the contents may be thoroughly strained and in which the tendency to clog up the strainer is reduced to a minimum.

A further object is to provide for easily cleaning the spout and strainer.

To this end I provide a pot with a spout extending its entire height, making the entrance thereto from the pot so large that access may be easily had thereto. I also provide a removable strainer which permits of easily and thoroughly cleaning said strainer and which removal makes said free access to the inside of the spout possible.

My invention is more fully described in the following specifications and clearly illustrated in the accompanying drawing, in which:—

Figure 1, is a vertical central sectional view of my coffee-pot. Fig. 2, is a vertical sectional view thereof on line X—X of Fig. 1 and Fig. 3, shows the strainer in detail, in two views.

The numeral 1 designates the pot which is provided with the usual lid 2.

The numeral 3 designates the spout. This spout extends from the top to the bottom of the pot and opens into the pot its entire length said opening being tapered and wider at its top than at its bottom.

The numeral 4 designates guide strips. These strips are secured to the inside of the pot in close proximity to the edge of said opening, one at either side.

The numeral 5 designates the strainer. This strainer comprises the frame in which is secured a screen 6 of fine wire mesh. This strainer is made approximately V shaped and is curved to approximate the curve of the pot. The strainer is inserted between the guide strips 4 and is provided with a suitable projection 7 at its top by which it may be removed. When in position the strainer stands away from the inner wall of the pot at the top sufficiently to allow the depending flange 8 of the lid to enter between it and the wall, thus preventing the ground coffee from passing out through this crevice.

It will be readily seen that with my device the liquid will be subjected to the strainer the full length of the pot and will not be confined to a limited point, thus permitting an easy flow thereof from the pot and allowing the use of a finer mesh than could otherwise be used.

The ease with which the device can be kept clean is the most important feature of my invention as the strainer may be easily removed, which removal will expose the entire inside of the spout.

It is evident that my device may be applied with equal facility to tea-pots, milk-cans or other vessels in which the contents are to be strained and in which cleanliness is important.

Having thus fully described my invention what I claim and desire to secure by Letters Patent is:—

A pot comprising a body having ends spaced apart and forming an opening which extends from the top to the bottom of the pot, said opening having its side edges in synclinical relation to each other, guides attached to the synclined edges of said body and lying parallel with the edges to which they are attached, a semi-conical strip forming a spout which is secured at its edges to the edges of the body and which extends over the opening between said body edges and from the top to the bottom of the pot, and a cuneate detachable strainer of single thickness of material supported in said guides and bearing at its lower edge against the lower end of the spout and having its upper edge at the same level as the upper edge of the body, and a cover for the body the edge of which fits between the upper edge of the strainer and the inner side of the body of the pot.

In testimony whereof I affix my signature in presence of two witnesses.

ALVIN W. WHITMAN.

Witnesses:
JOHN R. GARRETT,
A. K. STAUFFER.